(12) United States Patent
Lehmann et al.

(10) Patent No.: US 12,179,600 B2
(45) Date of Patent: Dec. 31, 2024

(54) HYBRID TRANSMISSION, AND DRIVE TRAIN HAVING A HYBRID TRANSMISSION

(71) Applicant: Schaeffler Technologies AG & Co. KG, Herzogenaurach (DE)

(72) Inventors: Steffen Lehmann, Ettlingen (DE); Laurent Bayoux, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/287,353

(22) PCT Filed: Mar. 29, 2022

(86) PCT No.: PCT/DE2022/100242
§ 371 (c)(1),
(2) Date: Oct. 18, 2023

(87) PCT Pub. No.: WO2022/233357
PCT Pub. Date: Nov. 10, 2022

(65) Prior Publication Data
US 2024/0198783 A1    Jun. 20, 2024

(30) Foreign Application Priority Data

May 3, 2021 (DE) .................. 10 2021 111 350.4
Mar. 21, 2022 (DE) .................. 10 2022 106 552.9

(51) Int. Cl.
*B60K 6/36* (2007.10)
*B60K 6/387* (2007.10)
(Continued)

(52) U.S. Cl.
CPC ............ *B60K 6/547* (2013.01); *B60K 6/36* (2013.01); *B60K 6/387* (2013.01); *B60K 6/442* (2013.01)

(58) Field of Classification Search
CPC .......... B60K 6/547; B60K 6/36; B60K 6/387; B60K 6/442
See application file for complete search history.

(56) References Cited

U.S. PATENT DOCUMENTS

| | | | |
|---|---|---|---|
| 5,513,719 A * | 5/1996 | Moroto ............... | B60K 6/24 903/952 |
| 7,191,859 B2 * | 3/2007 | Hashimoto ........... | B60W 10/02 903/906 |

(Continued)

FOREIGN PATENT DOCUMENTS

| CN | 110239334 A | 9/2019 |
|---|---|---|
| CN | 112659879 A | 4/2021 |

(Continued)

OTHER PUBLICATIONS

DE102011089710 (Year: 2013).*

*Primary Examiner* — Derek D Knight (57) ABSTRACT

A hybrid transmission for a hybrid vehicle includes a first torque drive train having an input shaft connectable to an internal combustion engine and a first electric machine torque-transmittingly connected to the input shaft; a second torque drive train that includes a second electric machine; an output shaft that torque-transmittingly connectable to the first torque drive train and/or the second torque drive train; and a first disconnect clutch that torque-transmittingly connects or disconnects the first torque drive train to or from the output shaft. The hybrid transmission being equipped with a second disconnect clutch that torque-transmittingly connects or disconnects the second toque drive train to or from the output shaft.

14 Claims, 3 Drawing Sheets

(51) Int. Cl.
*B60K 6/442* (2007.10)
*B60K 6/547* (2007.10)

(56) References Cited

U.S. PATENT DOCUMENTS

| | | |
|---|---|---|
| 2015/0111694 A1 | 4/2015 | Kim |
| 2016/0218584 A1 | 7/2016 | Fukushima |
| 2020/0292008 A1 | 9/2020 | Tomita |

FOREIGN PATENT DOCUMENTS

| | | | |
|---|---|---|---|
| DE | 102012203611 A1 | 10/2012 | |
| DE | 102011089710 A1 * | 6/2013 | ............. B60K 6/442 |
| DE | 112015006071 T5 | 10/2017 | |
| DE | 112016003890 T5 | 5/2018 | |
| DE | 102017127695 A1 | 5/2019 | |
| DE | 102018103245 A1 | 5/2019 | |
| DE | 102019115750 A1 | 12/2020 | |
| DE | 102019122557 A1 | 2/2021 | |
| DE | 102019132941 A1 | 6/2021 | |
| KR | 20130065419 A | 6/2013 | |
| WO | 2019101264 A1 | 5/2019 | |

* cited by examiner

HYBRID TRANSMISSION, AND DRIVE TRAIN HAVING A HYBRID TRANSMISSION

CROSS-REFERENCE TO RELATED APPLICATIONS

This application is the U.S. National Phase of PCT Appln. No. PCT/DE2022/100242 filed Mar. 29, 2022, which claims priority to DE 102022106552.9 filed Mar. 21, 2022, which in turn claims priority to DE 102021111350.4 filed on May 3, 2021, the entire disclosures of which are incorporated by reference herein.

TECHNICAL FIELD

The present disclosure relates to a hybrid transmission for a hybrid vehicle, having a first torque drive train that has an input shaft connectable to an internal combustion engine and a first electric machine/e-machine connectable or connected to the input shaft in a torque-transmitting manner, a second torque drive train that has a second electric machine/e-machine different from the first electric machine, an output shaft/drive axle that is connectable or connected to the first torque drive train and/or to the second torque drive train in a torque-transmitting manner, and a second disconnect clutch that connects the second torque drive train to the output shaft in a torque-transmitting manner in a first switching state and disconnects it from the output shaft in a torque-transmitting manner in a second switching state. Furthermore, the hybrid transmission has a first disconnect clutch that connects the first torque drive train to the output shaft in a torque-transmitting manner in a first switching state and disconnects it from the output shaft in a torque-transmitting manner in a second switching state. In addition, the present disclosure relates to a drive train having such a hybrid transmission.

BACKGROUND

Such hybrid transmissions with two electric machines and an internal combustion engine are already known from the prior art. For example, DE 10 2018 103 245 A1 discloses a drive unit for a drive train of a hybrid motor vehicle, having an internal combustion engine, a first electric machine, a second electric machine arranged coaxially with respect to its rotor to an axis of rotation of a rotor of the first electric machine, a first gear-ratio stage arranged between a drive component coupled or couplable in a non-rotatable manner to an output shaft of the internal combustion engine and a drive shaft of the first electric machine and/or the second electric machine, and a transmission component unit via which the drive shaft of the respective electric machine is coupled or couplable to wheel drive shafts.

Various transmission structures of such a hybrid transmission are also shown in patent applications US 2016/0218584 A1, DE 11 2015 006 071 T5 and WO 2019/101 264 A1.

Such hybrid transmissions are also referred to as dedicated hybrid transmissions ("DHT"). In these, the mechanical transmission part is simplified, for example by omitting the reverse gear, and instead at least one electric machine integrated into the transmission is used to provide the full range of functions. Dedicated hybrid transmissions can emerge from familiar transmission concepts, i.e., dual-clutch transmissions, torque converter planetary transmissions, continuously variable transmissions (CVT) or automated manual transmissions. In this regard, the electric machine becomes a part of the transmission, wherein its connection can be made on different transmission shafts. In addition to the parallel and/or serial hybrid modes, one or more power-split operating states can also be provided in combination with a planetary transmission.

In this context, a serial hybrid mode is understood to mean that the internal combustion engine no longer has a mechanical/torque-transmitting connection to the drive axle/output shaft. The internal combustion engine drives the first electric machine, which mainly acts as a generator, which in turn supplies electric power to the second electric machine, which mainly acts as a traction motor/drive motor, or charges a battery. The drive axle is driven by the second electric machine. In this context, a parallel hybrid mode is understood to mean that the internal combustion engine has a mechanical/torque-transmitting connection to the drive axle/output shaft. The second electric machine can run idle, boost or recuperate.

However, the prior art always suffers from the disadvantage that in the hybrid transmission concepts known to date, the second electric machine often runs idle in the parallel hybrid mode, generating a corresponding resistance due to induction and requiring the second electric machine to be actively rotated. This means that an active short circuit occurs and energy must be generated for it by the first electric machine. As a result, transmission efficiency is reduced, making the hybrid transmission less efficient at certain operating points, in particular in parallel hybrid mode.

SUMMARY

The present disclosure avoids or at least mitigates the disadvantages of the prior art. In particular, a hybrid transmission and a drive train having a hybrid transmission that exhibits a high degree of transmission efficiency and is efficient without limiting functionality are provided.

According to an exemplary embodiment of the present disclosure, the hybrid transmission has a second disconnect clutch that connects a second torque drive train to an output shaft in a torque-transmitting manner in a first switching state and disconnects it from the output shaft in a torque-transmitting manner in a second switching state. This has the advantage that it is possible to decouple the second electric machine and no longer have to drag it along. This improves the efficiency of the hybrid transmission, in particular in parallel hybrid mode. By coupling the second electric machine/the second torque drive train via the second disconnect clutch in a switchable manner, the second electric machine can be quickly recoupled, for example during acceleration. Thus, the first disconnect clutch, which is usually located between the internal combustion engine and the drive axle/output shaft or between the first electric machine and the second electric machine, can enable serial driving/serial hybrid mode in the open state and parallel driving/parallel hybrid mode in the closed state, and the second disconnect clutch can enable the second electric machine to be decoupled (in particular in parallel operation). Such an optional decoupling of the second electric machine in a hybrid transmission that can be switched between serial and parallel has not been known to date. Furthermore, according to the present disclosure, a rotor of the first electric machine is mounted on the input shaft in a non-rotatable manner, wherein this rotor is connected to the input shaft in a gear-ratio-free manner. Further, a rotor of the second electric machine is arranged on a rotor shaft in a non-rotatable manner that is arranged coaxially to the input shaft. In this regard, the rotor shaft is connected or connectable in a torque-transmitting manner to an intermediate shaft via a first gear-ratio stage. The same applies to the input shaft or a second input shaft section, which is connected or connectable in a torque-transmitting manner to the intermediate shaft via a second gear-ratio stage. According to the present disclosure, all gear wheels of both the first gear-ratio stage and the second gear-ratio stage are arranged axially between the first and the second electric machine. In this way, a compact arrangement of the hybrid transmission can be found.

According to an exemplary embodiment, the first disconnect clutch and the second disconnect clutch can form an alternatingly acting clutch unit and/or have a common actuator for alternating actuation such that one of the two disconnect clutches is in its first switching state and the other of the two disconnect clutches is in its second switching state. In other words, the first disconnect clutch and the second disconnect clutch can form a clutch/clutch unit acting in alternating directions, for example a claw clutch unit, in which the alternating closing/opening of the clutch unit simultaneously switches the serial and parallel hybrid modes and couples/decouples the second electric machine. Alternatively, the first disconnect clutch and the second disconnect clutch can be designed as two separate clutches, for example as claw clutches, which can be closed in an alternating manner via a common actuating element/a common actuator, such as a shift fork. This ensures that one of the two disconnect clutches is always open and the other of the two disconnect clutches is always closed. In this case, the claw clutch unit or the two claw clutches are actuated with only a small speed difference after synchronizing the differential speeds via the electric machines.

The first disconnect clutch may be arranged on the input shaft and the second disconnect clutch may be arranged on an intermediate shaft.

Alternatively, the hybrid transmission can have an intermediate shaft on which the first disconnect clutch and the second disconnect clutch are arranged. In other words, the clutch unit can be arranged on a common shaft. This allows the clutch unit to be designed in a compact manner and easy to operate.

According to another exemplary embodiment, the hybrid transmission can have an intermediate shaft on which the second disconnect clutch is arranged, wherein the first disconnect clutch is arranged on the input shaft. This means that the two disconnect clutches are arranged on different, for example, axially offset shafts. This has the advantage that different transmission ratios can be realized in a simple manner. In addition, the hybrid transmission can be designed to be axially shorter and with fewer gear wheels by arranging it on the two shafts.

Furthermore, according to embodiments, the intermediate shaft is connected to the output shaft via a third gear-ratio stage. This can be used to limit the number of gear-ratio stages required. This has the advantage that the torque of the first torque drive train or the second torque drive train is translated to the output shaft via a total of two gear-ratio stages in each case.

According to embodiments, a rotor of the second electric machine can be mounted on a rotor shaft in a non-rotatable manner. The rotor shaft can be arranged coaxially to the input shaft. Alternatively, the rotor shaft can also be arranged axially parallel to the input shaft. The rotor shaft can be connected to the intermediate shaft in a torque-transmitting manner via a first gear-ratio stage. In this way, a suitable transmission ratio can be set.

According to the present disclosure, a rotor of the first electric machine is mounted on the input shaft in a non-rotatable manner. The input shaft can be connected to the intermediate shaft in a torque-transmitting manner via a second gear-ratio stage. In this way, a suitable transmission ratio can be set.

According to embodiments, the first gear-ratio stage can have a smaller transmission ratio than the second gear-ratio stage. This means that the drive power is translated to the output shaft at higher speeds via the second torque drive train (with the second electric machine) compared to the first torque drive train (with the internal combustion engine).

In embodiments, exactly one gear wheel of the first gear-ratio stage is provided on the rotor shaft of the second electric machine, and exactly one gear wheel of the second gear-ratio stage is provided on the input shaft or a second input shaft section thereof.

In embodiments, exactly two gear wheels of the first and second gear-ratio stages can be provided on the intermediate shaft. This may be an idler gear and a fixed gear. This allows for a simple and space-saving structure.

Embodiments provide that the gear wheel of the second gear-ratio stage, which is located on the intermediate shaft, is also a gear wheel of the third gear-ratio stage and thus represents the connection of the intermediate shaft to the output shaft. This may be a fixed gear, so that only the connection of the idler gear on the input shaft to the latter is necessary to enable recuperation.

Alternatively or in addition, exactly one gear wheel on the intermediate shaft and exactly one gear wheel on the input shaft can be designed as idler gears. The first and second clutches are then respectively assigned to these idler gears for synchronization with the input shaft or intermediate shaft. The only gear wheel on the rotor shaft of the second electric machine is therefore a fixed gear.

According to embodiments, the first electric machine can be operated by the internal combustion engine essentially as a generator and the second electric machine can act essentially as a drive motor. The first electric machine may serve as a generator for supplying electric power to the second electric machine. This means that the first electric machine may be electrically connected to the second electric machine. The first electric machine can also serve as a generator for charging a battery. Additionally, the first electric machine can serve as a drive motor/traction motor, in particular for boosting in serial hybrid mode.

According to embodiments, the hybrid transmission can have a torsional vibration damper, which is arranged on the input shaft. This means that the input shaft has two input shaft sections that can rotate relative to one another and are connected to one another via the torsional vibration damper. In this regard, one of the input shaft sections is connectable to the internal combustion engine and the other one of the input shaft sections is connectable or connected to the first electric machine.

In particular, the torsional vibration damper can be integrated into the rotor of the first electric machine in this regard. This provides the advantage that the hybrid transmission can be designed to be particularly compact.

According to embodiments, the hybrid transmission can have a slip clutch, which is arranged on the input shaft. In this manner, the drive train can be protected against impact torques by the slip clutch serving as overload protection.

According to embodiments, the first electric machine and the second electric machine can be arranged coaxially. The coaxial arrangement allows for the installation space requirements of the hybrid transmission to be further optimized. The first disconnect clutch, the second disconnect clutch, the slip clutch, the first gear-ratio stage and/or the second gear-ratio stage can be arranged axially between the first and the second electric machine. Alternatively, the first electric machine and the second electric machine can be arranged axially adjacent. According to embodiments, the first electric machine and the second electric machine can be arranged axially parallel. Depending on the installation space requirements, an axially parallel arrangement can be advantageous.

According to embodiments, the hybrid transmission can have a differential, which is arranged in the torque flow between the first torque drive train and the second torque drive train on the one hand and the output shaft on the other. This allows the torque of the torque drive trains to be transmitted to the output shaft or to two output shafts.

A drive train for a hybrid vehicle is further provided. The drive train has a hybrid transmission according to the present disclosure and an internal combustion engine that is connected to the input shaft of the hybrid transmission in a torque-transmitting manner. The first electric machine can be arranged axially between the second electric machine and the internal combustion engine.

In other words, the present disclosure relates to a 2 e-machine hybrid transmission that enables serial driving or serial/parallel driving (i.e., switching between serial and parallel) and additionally enables the decoupling of the second electric machine (i.e., the driving machine). At the same time, the transmission concept can be easily redesigned from the switchable serial/parallel design to a purely serial transmission concept in which the electric machines, power electronics and/or cooling/lubrication components can be retained.

BRIEF DESCRIPTION OF THE DRAWINGS

The present disclosure is explained below with the aid of drawings. In the figures.

The figures are only schematic in nature and serve only for understanding the present disclosure. The same elements are provided with the same reference symbols. The features of the individual embodiments can be combined with one another as desired.

DETAILED DESCRIPTION

Figure 1:
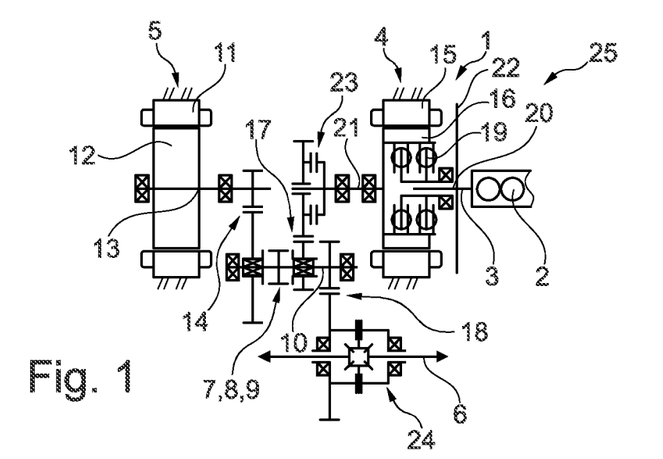
FIG. 1 shows a schematic representation of a hybrid transmission according to the present disclosure and a drive train according to the present disclosure having such a hybrid transmission in a first embodiment.
Figure 2:
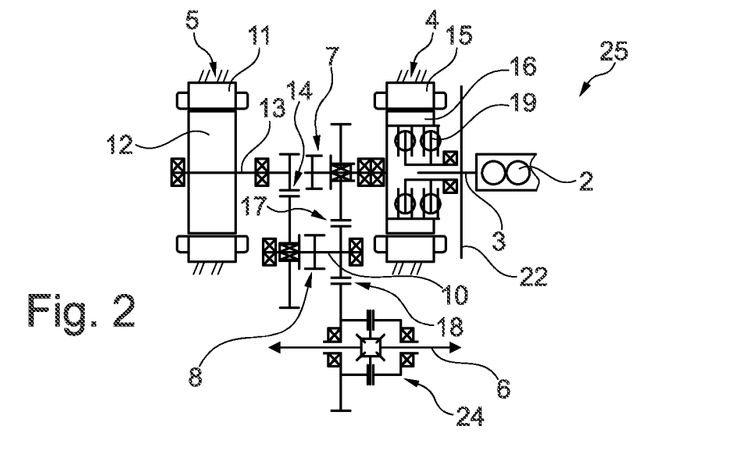
FIG. 2 shows a schematic representation of the hybrid transmission according to the present disclosure and the drive train according to the present disclosure having such a hybrid transmission in a second embodiment.

FIGS. 1 and 2 show two embodiments of a hybrid transmission 1 according to the present disclosure for a hybrid vehicle. The hybrid transmission 1 has a first torque drive train, which has an input shaft 3 connectable to an internal combustion engine 2 and a first electric machine 4 connectable or connected to the input shaft 3 in a torque-transmitting manner. The hybrid transmission 1 has a second torque drive train, which has a second electric machine 5 that is different from the first electric machine 4. The hybrid transmission 1 has an output shaft 6 that is connectable or connected to the first torque drive train and/or to the second torque drive train in a torque-transmitting manner.

The hybrid transmission 1 has a first disconnect clutch 7. The first disconnect clutch 7 connects the first torque drive train in a first switching state/in a closed state to the output shaft 6 in a torque-transmitting manner/mechanically and disconnects the first torque drive train in a second switching state/in an open state from the output shaft 6 in a torque-transmitting manner/mechanically. The first disconnect clutch 7 can be arranged in the torque flow between the internal combustion engine 2 and the output shaft 6 or between the first electric machine 4 and the second electric machine 5. Thus, depending on the switching position of the first disconnect clutch 7, it is possible to switch between a serial hybrid mode in which the internal combustion engine 2 is mechanically decoupled and a parallel hybrid mode. In the embodiment shown, the first disconnect clutch 7 is arranged between the internal combustion engine 2 and the output shaft 6.

The hybrid transmission 1 has a second disconnect clutch 8. The second disconnect clutch 8 connects the second torque drive train in a first switching state/in a closed state to the output shaft 6 in a torque-transmitting manner/mechanically and disconnects the second torque drive train in a second switching state/in an open state from the output shaft 6 in a torque-transmitting manner/mechanically. Thus, the second electric machine 5 can be decoupled by the second disconnect clutch 8, in particular in the parallel hybrid mode, i.e., with the first disconnect clutch 7 open. By coupling the second electric machine 5/the second torque drive train via the second disconnect clutch 8 in a switchable manner, the second electric machine 5 can be quickly recoupled, for example during acceleration.

The first disconnect clutch 7 and the second disconnect clutch 8 can form an alternatingly acting clutch unit 9 (cf. FIG. 1). This means that the first disconnect clutch 7 and the second disconnect clutch 8 form a clutch/clutch unit 9 acting in alternating directions, for example a claw clutch unit, in which the alternating closing/opening of the clutch unit 9 simultaneously switches serial and parallel hybrid modes and couples/decouples the second electric machine 5. Alternatively, the first disconnect clutch 7 and the second disconnect clutch 8 can have a common actuator (not shown) for alternating actuation (cf. FIG. 2). This means that the first disconnect clutch 7 and the second disconnect clutch 8 are designed as two separate clutches (for example on two different shafts), for example as claw clutches, which can be closed in an alternating manner via a common actuating element/actuator, such as a shift fork. Thus, one of the two disconnect clutches 7, 8 is always open and the other of the two disconnect clutches 7, 8 is always closed.

In addition, the hybrid transmission 1 can have an intermediate shaft 10. In the first embodiment, the first disconnect clutch 7 and the second disconnect clutch 8 are arranged on the intermediate shaft 10 (i.e., a common shaft) (cf. FIG. 1). In particular, the alternatingly acting clutch unit 9 is thus arranged on the intermediate shaft 10. Alternatively, (only) the second disconnect clutch 8 can be arranged on the intermediate shaft 10 and the first disconnect clutch 7 can be arranged on the input shaft 3 (cf. FIG. 2). This means, therefore, that the two disconnect clutches 7, 8 can be arranged on different shafts, here on axially offset shafts, and can be actuated in an alternating manner via the common actuator (not shown).

The second electric machine 5 has a stator 11 and a rotor 12 rotatably mounted within the stator 11. Furthermore, the rotor 12 of the second electric machine 5 can be mounted on a rotor shaft 13 in a non-rotatable manner. In particular, the rotor shaft 13 can be arranged coaxially to the input shaft 3 (cf. FIGS. 1 and 2). Alternatively, the rotor shaft 13 can also be arranged axially parallel to the input shaft 3, although this is not shown. The rotor shaft 13 can be connected in a torque-transmitting manner to the intermediate shaft 10 via a first gear-ratio stage 14. The first electric machine 4 has a stator 15 and a rotor 16 rotatably mounted within the stator 15. Furthermore, the rotor 16 of the first electric machine 4 can be mounted on the input shaft 3 in a non-rotatable manner. The input shaft 3 can be connected to the intermediate shaft 10 in a torque-transmitting manner via a second gear-ratio stage 17. In addition, the intermediate shaft 10 can be connected to the output shaft 6 via a third gear-ratio stage 18.

In embodiments, the first gear-ratio stage 14 can have a smaller transmission ratio than the second gear-ratio stage 17. This means that the drive power is translated to the output shaft 6 at higher speeds via the second torque drive train (with the second electric machine 5) compared to the first torque drive train (with the internal combustion engine 3 or the first electric machine 4).

In particular, the first electric machine 4 can function essentially as a generator. The second electric machine 5 can function essentially as a drive motor. The first electric machine 4 can serve as a generator for supplying electric power to the second electric machine 5. This means that the first electric machine 4 may be electrically connected to the second electric machine 5. Also, the first electric machine 4 can serve as a generator for charging an accumulator/a battery (for the second electric machine 5). Additionally, the first electric machine 4 can serve as a drive motor/traction motor.

Furthermore, the hybrid transmission 1 can have a torsional vibration damper 19, which is arranged on the input shaft 3. This means that the input shaft 3 has two input shaft sections 20, 21 that can rotate relative to one another and are connected to one another via the torsional vibration damper 19. In this regard, a first input shaft section 20 is connectable to the internal combustion engine 2 and a second input shaft section 21 is connectable or connected to the first electric machine 4. In particular, the torsional vibration damper 19 can be integrated into the rotor 16 of the first electric machine 4. In particular, the first electric machine 4 is connected in a non-rotatable manner to a flywheel 22 of the internal combustion engine 2 via the torsional vibration damper 19.

In addition, the hybrid transmission 1 can have a slip clutch 23 (cf. FIG. 1), which is arranged on the input shaft 3 or on the second input shaft section 21.

Furthermore, the first electric machine 4 and the second electric machine 5 can be arranged coaxially. Alternatively, the first electric machine 4 and the second electric machine 5 can be arranged axially parallel, although this is not shown.

In embodiments, the hybrid transmission 1 can have a differential 24, which is arranged in the torque flow between the first torque drive train and the second torque drive train on the one hand and the output shaft 6 on the other. In the embodiment shown, the differential transmits the torque from the intermediate shaft 10 to the output shaft 6 or both output shafts 6.

In addition, the present disclosure relates to a drive train 25 for a hybrid vehicle, having the hybrid transmission 1 and the internal combustion engine 2 connectable or connected to the input shaft 3 of the hybrid transmission 1 in a torque-transmitting manner.

Figure 1A:
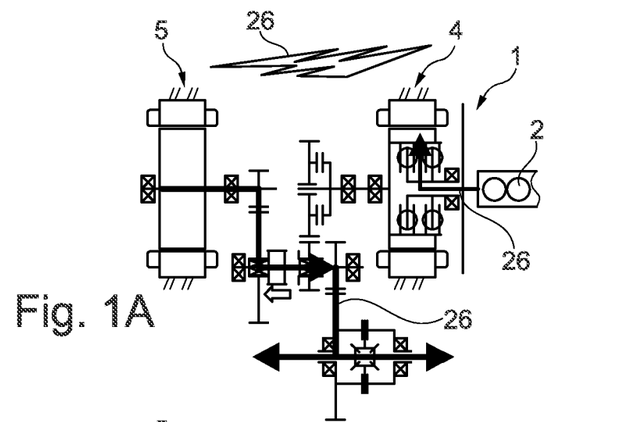
FIG. 1A shows a schematic representation of the hybrid transmission and its drive power flow in a first switching state.
Figure 1B:
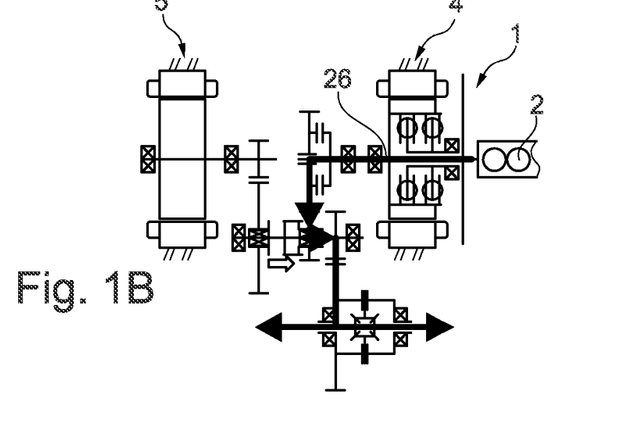
FIG. 1B shows a schematic representation of the hybrid transmission and its drive power flow in a second switching state.

FIGS. 1A and 1B show a drive power flow 26 in a first and second switching state, respectively, of the clutch unit 9 for the hybrid transmission 1 in the first embodiment. In FIG. 1A, the second disconnect clutch 8 on the intermediate shaft 10 is closed (and the first disconnect clutch 7 is open). A serial hybrid mode is enabled. The first electric machine 4 serves as a generator. Torque is provided by the internal combustion engine 2 for the generator operation of the first electric machine 4. In FIG. 1B, the first disconnect clutch 7 is closed (and the second disconnect clutch 8 is open). A parallel hybrid mode is enabled. The second electric machine 5 remains stationary/is decoupled from the output shaft 6. The first electric machine can serve as a generator as well as a drive motor for boosting. For a quick switchover from the parallel to the serial hybrid mode, the second electric machine 5 rotates without load to a synchronous speed of the intermediate shaft 10, and the first disconnect clutch 7 is opened and the second disconnect clutch 8 is closed.

Figure 2A:
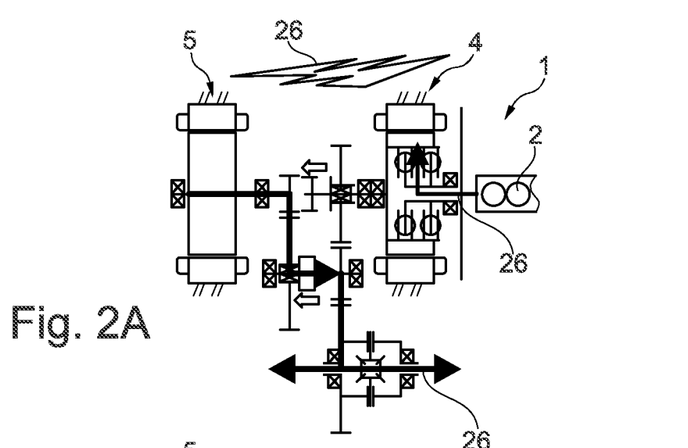
FIG. 2A shows a schematic representation of the hybrid transmission and its drive power flow in a first switching state.
Figure 2B:
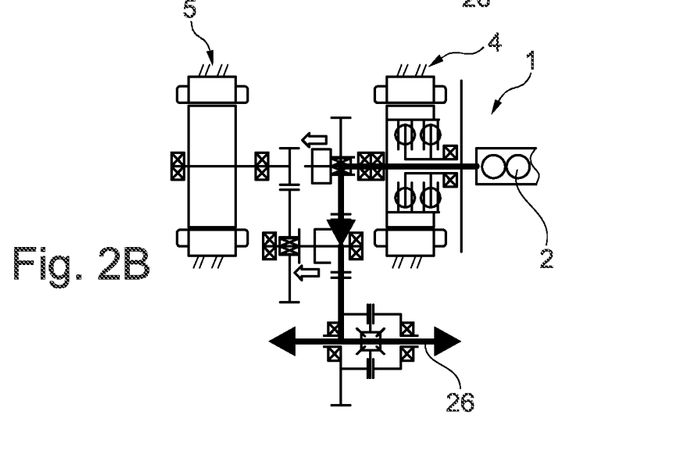
FIG. 2B shows a schematic representation of the hybrid transmission and its drive power flow in a second switching state.

FIGS. 2A and 2B show a drive power flow 26 in a first and second switching state, respectively, of the disconnect clutches 7, 8 for the hybrid transmission 1 in the second embodiment. In FIG. 2A, the second disconnect clutch 8 on the intermediate shaft 10 is closed (and the first disconnect clutch 7 on the input shaft 3 is open). A serial hybrid mode is enabled. The first electric machine 4 serves as a generator. Torque is provided by the internal combustion engine 2 for the generator operation of the first electric machine 4. In FIG. 2B, the first disconnect clutch 7 on the input shaft 3 is closed (and the second disconnect clutch 8 on the intermediate shaft 10 is open). A parallel hybrid mode is enabled. The second electric machine 5 remains stationary/is decoupled from the output shaft 6. The first electric machine can serve as a generator as well as a drive motor for boosting. For a quick switchover from the parallel to the serial hybrid mode, the second electric machine 5 rotates without load to a synchronous speed of the intermediate shaft 10, and the first disconnect clutch 7 is opened and the second disconnect clutch 8 is closed.

Figure 3:
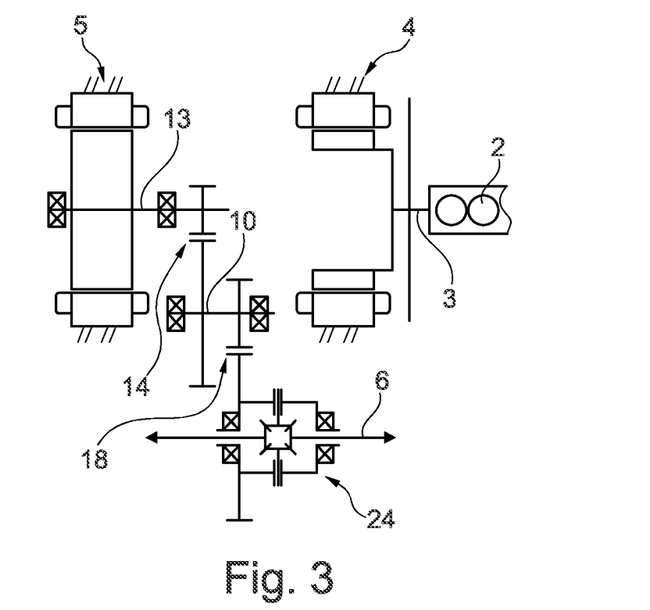
FIG. 3 shows a schematic representation of the hybrid transmission converted to a serial hybrid transmission.
Figure 3A:
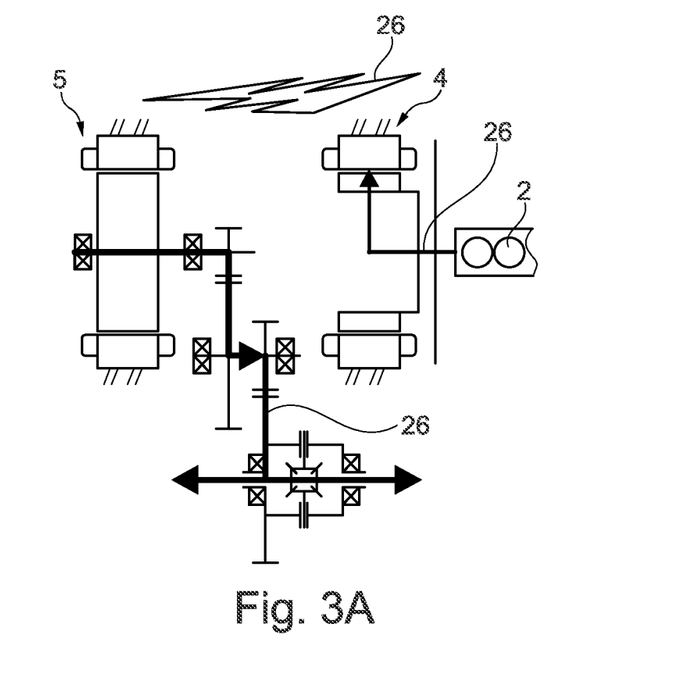
FIG. 3A shows a schematic diagram of the hybrid transmission and its drive power flow.

FIGS. 3 and 3A show a schematic representation of the hybrid transmission 1 according to the present disclosure, which has been converted to a serial hybrid transmission, and its drive power flow, respectively. This means that in the converted hybrid transmission, the direct drive by the internal combustion engine 2 was omitted, which is desirable for certain battery configurations (range extender, PHEV). Thus, the hybrid transmission 1 according to the present disclosure can be easily redesigned from a hybrid transmission 1 switchable between parallel and serial to a serial hybrid transmission while retaining the electric machines 4, 5, power electronics (not shown) and cooling/lubrication components (not shown).

LIST OF REFERENCE SYMBOLS

1 Hybrid transmission
2 Internal combustion engine
3 Input shaft
4 First electric machine
5 Second electric machine
6 Output shaft
7 First disconnect clutch
8 Second disconnect clutch
9 Clutch unit
10 Intermediate shaft
11 Stator
12 Rotor
13 Rotor shaft
14 First gear-ratio stage
15 Stator
16 Rotor
17 Second gear-ratio stage
18 Third gear-ratio stage
19 Torsional vibration damper
20 First input shaft section
21 Second input shaft section
22 Flywheel
23 Slip clutch
24 Differential
25 Drive train
26 Drive power flow

The invention claimed is:

1. A hybrid transmission for a hybrid vehicle, comprising:
a first torque drive train having an input shaft connectable to an internal combustion engine and a first electric machine connected to the input shaft in a torque-transmitting manner,
a second torque drive train having a second electric machine,
an output shaft that is connectable to at least one of the first torque drive train and the second torque drive train in a torque-transmitting manner,
a first disconnect clutch configured to connect the first torque drive train to the output shaft in a torque-transmitting manner in a first switching state and to disconnect the first torque drive train from the output shaft in a torque-transmitting manner in a second switching state, and
a second disconnect clutch configured to connect the second torque drive train to the output shaft in a torque-transmitting manner in a first switching state and to disconnect the second torque drive train from the output shaft in a torque-transmitting manner in a second switching state,
wherein a rotor of the first electric machine is mounted on the input shaft in a non-rotatable manner,
wherein a rotor of the second electric machine is mounted on a rotor shaft in a non-rotatable manner, the rotor shaft is arranged coaxially to the input shaft, and is connectable in a torque-transmitting manner to an intermediate shaft via a first gear-ratio stage,
wherein the input shaft is connectable in torque-transmitting manner to the intermediate shaft via a second gear-ratio stage,
wherein gear wheels of both the first and the second gear-ratio stages are arranged axially between the first electric machine and the second electric machine,
wherein exactly one of the gear wheels of the first gear-ratio stage is provided on the rotor shaft, and exactly one of the gear wheels of the second gear-ratio stage is provided on the input shaft,
wherein exactly two of the gear wheels of the first and second gear-ratio stages are provided on the intermediate shaft, and
wherein exactly one gear wheel on the intermediate shaft is designed as an idler gear and exactly one gear wheel on the input shaft is designed as an idler gear, and the first and second disconnect clutches are each designed for synchronizing exactly one idler gear with the input shaft and the intermediate shaft, respectively.

2. The hybrid transmission according to claim 1, wherein the first disconnect clutch is arranged on the input shaft, and the second disconnect clutch is arranged on the intermediate shaft.

3. The hybrid transmission according to claim 1, wherein the intermediate shaft is connected to the output shaft via a third gear-ratio stage.

4. The hybrid transmission according to claim 1, wherein the gear wheel on the intermediate shaft associated with the second gear-ratio stage is also a gear wheel of a third gear-ratio stage and connects the intermediate shaft to the output shaft.

5. The hybrid transmission according to claim 1, wherein the first electric machine is operated by the internal combustion engine as a generator, and the second electric machine acts as a drive motor.

6. The hybrid transmission according to claim 1, further comprising a torsional vibration damper arranged on the input shaft and integrated into the rotor of the first electric machine.

7. The hybrid transmission according to claim 1, further comprising a slip clutch arranged on the input shaft.

8. A drive train for a hybrid vehicle, comprising:
a hybrid transmission including:
a first torque drive train having an input shaft and a first electric machine connected to the input shaft in a torque-transmitting manner,
a second torque drive train having a second electric machine,
an output shaft that is connectable to at least one of the first torque drive train and the second torque drive train in a torque-transmitting manner,
a first disconnect clutch configured to connect the first torque drive train to the output shaft in a torque-transmitting manner in a first switching state and to disconnect the first torque drive train from the output shaft in a torque-transmitting manner in a second switching state, and
a second disconnect clutch configured to connect the second torque drive train to the output shaft in a torque-transmitting manner in a first switching state and to disconnect the second torque drive train from the output shaft in a torque-transmitting manner in a second switching state,
wherein a rotor of the first electric machine is mounted on the input shaft in a non-rotatable manner,
wherein a rotor of the second electric machine is mounted on a rotor shaft in a non-rotatable manner, the rotor shaft is arranged coaxially to the input shaft, and is connectable in a torque-transmitting manner to an intermediate shaft via a first gear-ratio stage, wherein the input shaft is connectable in torque-transmitting manner to the intermediate shaft via a second gear-ratio stage, and wherein gear wheels of both the first and the second gear-ratio stages are arranged axially between the first electric machine and the second electric machine;

an internal combustion engine which is connected in a torque-transmitting manner to the input shaft of the hybrid transmission;

wherein exactly one of the gear wheels of the first gear-ratio stage is provided on the rotor shaft, and exactly one of the gear wheels of the second gear-ratio stage is provided on the input shaft;

wherein exactly two of the gear wheels of the first and second gear-ratio stages are provided on the intermediate shaft; and wherein exactly one gear wheel on the intermediate shaft is designed as an idler gear and exactly one gear wheel on the input shaft is designed as an idler gear, and the first and second disconnect clutches are each designed for synchronizing exactly one idler gear with the input shaft and the intermediate shaft, respectively.

9. The drive train according to claim 8, wherein the first disconnect clutch is arranged on the input shaft, and the second disconnect clutch is arranged on the intermediate shaft.

10. The drive train according to claim 8, wherein the intermediate shaft is connected to the output shaft via a third gear-ratio stage.

11. The drive train according to claim 8, wherein the gear wheel on the intermediate shaft associated with the second gear-ratio stage is also a gear wheel of a third gear-ratio stage and connects the intermediate shaft to the output shaft.

12. The drive train according to claim 8, wherein the first electric machine is operated by the internal combustion engine as a generator, and the second electric machine acts as a drive motor.

13. The drive train according to claim 8, further comprising a torsional vibration damper arranged on the input shaft and integrated into the rotor of the first electric machine.

14. The drive train according to claim 8, further comprising a slip clutch arranged on the input shaft.

* * * * *